Dec. 6, 1932.　　　J. R. SNYDER　　　1,889,796
SHOCK ABSORBER
Original Filed Aug. 9, 1924
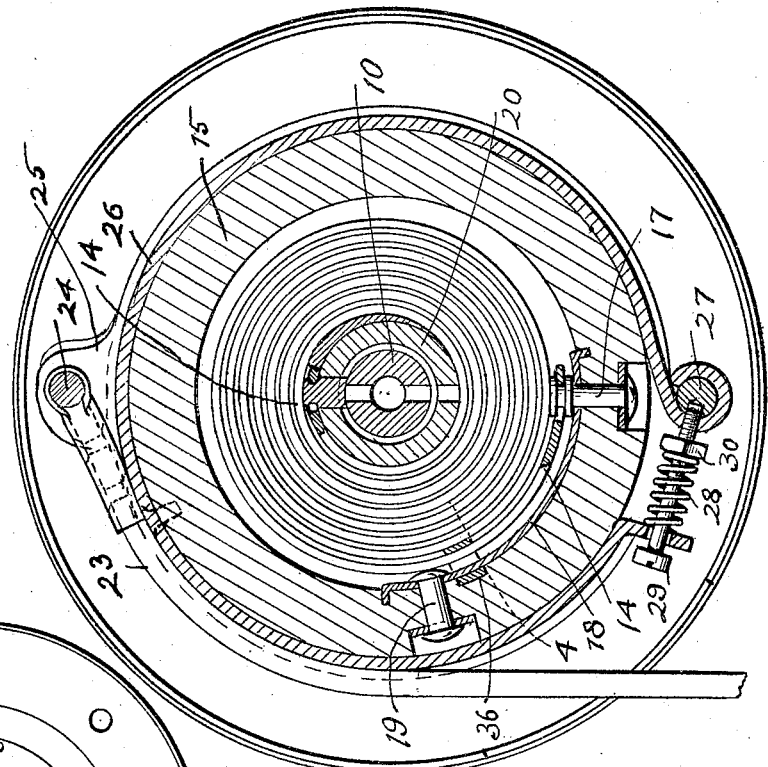
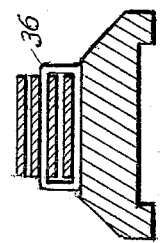
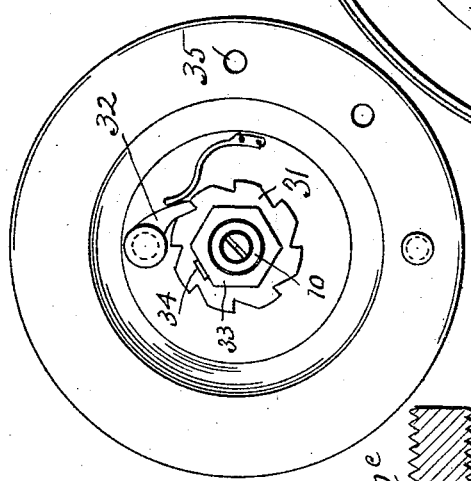
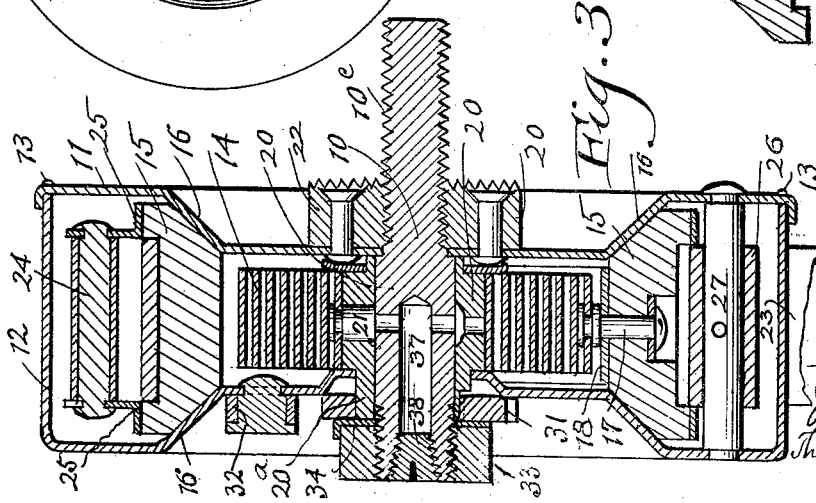
Inventor:
Jacob R. Snyder
Thurston Kwis +
Hudson
attys.

Patented Dec. 6, 1932

1,889,796

UNITED STATES PATENT OFFICE

JACOB R. SNYDER, OF CLEVELAND, OHIO

SHOCK ABSORBER

Application filed August 9, 1924, Serial No. 731,016. Renewed April 21, 1932.

This invention relates to improvements in shock absorbers, adapted particularly for use on motor vehicles to check the rebound movement of the main springs.

The object of the invention is to provide a novel and efficient construction of a shock absorber of the frictionally retarded type.

More particularly the invention aims to provide a shock absorber of the type wherein there is a frictionally retarded rotary member onto which a strap is wound and from which it is unwound, and having friction retarding means, the construction and application of which is an improvement over the friction imposing means heretofore utilized. In this connection it is the aim of the invention to provide means whereby there is an effectively regulated friction resistance which varies at different points in the cycle of operation of the shock absorber, and which retards the rotary member during the rebound stroke to a greater extent than during the compression stroke of the main spring.

Other objects are attained by my invention which may be here briefly summarized as consisting in certain novel details of construction, and combinations and arrangements of parts which will be described in the specification and set forth in the appended claims.

In the accompanying sheet of drawings wherein I have shown the preferred embodiment of the invention, Fig. 1 is a side elevation of the shock absorber; Fig. 2 is a sectional view at right angles to the axis, the same being shown on an enlarged scale; Fig. 3 is a sectional view at right angles to the section of Fig. 2; and Fig. 4 is a detail sectional view substantially along the line 4 of Fig. 2.

Referring now to the drawing, 10 represents a stationary center bolt which in the ordinary use of the device is secured to the chassis frame of the vehicle by a fitting screwed onto the reduced end 10c of the center bolt. Additionally the device included a stationary casing composed in this instance of two portions 11 and 12. As here shown, the part 11 is in the form of a disk which forms one side of the casing. The part 12 forms the opposite side and the periphery of the casing. It is provided with a laterally bent peripheral portion adapted to engage the disk 11, and preferably it is provided at intervals with lugs 13 which extend through openings in the companion part 11. In this instance the outer portion of the casing formed by the two parts 11 and 12 is somewhat wider than the inner portion, the outer part being extended laterally to form a support for the frictionally retarded rotatable member.

Surrounding the center bolt and located within the inner or narrower part of the casing is a spiral spring 14, and outwardly of the spring is the rotatable frictionally retarded member in the form of an annulus or ring 15 which is preferably formed of self-lubricating material such as oil impregnated wood, and is supported by the two parts 11 and 12 of the casing on shoulders 16 which may be inclined as shown or square. The outer end of the spring is attached to the annulus 15 by a fastening device which may be in the form of a rivet 17 (see Fig. 2). The inner surface of the ring where the rivet passes through it is preferably faced for a suitable distance with a metal strip or insert 18 through one end of which the rivet 17 passes. The opposite end may be held to the drum by a rivet or equivalent device 19. It might be here stated that the function of this spring is, of course, to rotate the annulus 15 to wind thereon the strap during the compression movement of the main springs.

The inner end of the spring 14 is stationary and is preferably secured in any suitable way to a collar 20 surrounding the center bolt 10. In this instance the end of the spring is attached to the collar by a pin or block 21 extending into a suitable opening formed in the collar.

One end of this collar bears against the inner or central portion of the casing part or disk 11 which is clamped against a shoulder of the center bolt by a nut 22 screwed onto the reduced end 10c of the center bolt, to which nut the disk 11 is in this instance riveted. The opposite end of the collar 20 has an extension 20a which projects out beyond the casing, the part 12 of the casing being fitted onto this extension as shown.

The annulus 15 is adapted to have connected to it the inner end of a strap 23 which extends out through an opening in the peripheral part of the casing and is designed to be connected to the axle. In this instance the inner end of the strap is connected to a pin 24 which is mounted in ears of a pair of small metal clips or brackets 25 which are secured to the outer surface of the annulus 15 near its sides.

The strap 23 does not directly engage the annulus 15, but interposed between the strap and the annulus is a stationary friction member 26 in the form of a band, which is wrapped around the annulus for the major portion of its circumference. One end of the band 26 is held stationary by being hooked around a pin 27 which extends between the sides of the casing outside or beyond the annulus 15, this being clearly illustrated in Figs. 2 and 3. The other end of the band 26 is free, as shown in Fig. 2, this band extending from its fixed end around the periphery of the annulus in the same direction that the strap 23 extends from the pin 24.

The strap 23 bears upon and is designed to be wrapped on the band 26, and inasmuch as the band 26 is stationary, it is obvious that when the annulus is rotated it will frictionally engage the inner surface of the band 26, and at the same time the strap 23 will frictionally engage or slide over the outer surface of the band 26.

It will be apparent that during the compression stroke of the main spring, during which time the spring 14 rotates the annulus 15 so as to wind in the strap, there is practically no load on the strap, in consequence of which the strap will slide freely over the band 26, which therefore offers practically no resistance to the winding in of the strap.

Furthermore, during this part of the cycle, the strap 23 does not press the band down against the annulus, and whatever frictional resistance there may be between the strap and band is exerted in a direction toward or against the anchored end with the result that it has a tendency to loosen the band on the annulus. The band is thus released from the annulus, and this is preferably enhanced either by so forming the band that it has a natural or inherent tendency to open up or spread away from the annulus, as by forming it of steel or other material having a suitable spring or elasticity, or by providing a spring or other device extraneous to the band for opening it when it is relieved of pressure by the belt. Such an arrangement is shown in Fig. 2 wherein a spring 28 acts on the free end of the band so as to open it. This spring surrounds a pin or screw 29 having threaded engagement with the pin 27 and one of its ends bears against the free end of band 26 while its other end engages an abutment in the form of an adjustable nut 30 on the screw 29.

However, during the rebound stroke there is a considerable load on strap 23, and the effect of this is to cause a pressure on the band 26 and at the same time pull the band down against the surface of the annulus with the result that the rebound movement is retarded by the friction of the drum on the band and by the friction of the strap on the band. Additionally, of course, the spring 14 is wound up during this part of the cycle of operations, and the gradually increased tension imposed in the spring also has a tendency to check the rebound. From the above it will be seen that notwithstanding the fact that the annulus 15 rotates relative to the friction member 26 during both the compression and rebound movements of the main springs of the vehicle, nevertheless it frictionally resists the rotation of the annulus 15 only in one direction, or during the rebound stroke. By reason of these characteristics and new function the band 26 may be aptly termed a floating friction member.

In addition to the above I have provided a novel and effective means for adjusting the normal tension of the spring 14. This includes a ratchet or ratchet disk 31 which is fitted onto the extension 20a of the collar 20 on the outer side of the casing part 12, and it is in any convenient way held from rotating on the collar. A pawl 32, carried by the casing, engages the ratchet 31 in such a way as to normally prevent the spring from unwinding by turning the collar. The parts are normally held in properly assembled relationship by a nut 33 screwed onto the center bolt, this nut pressing the ratchet 31 against the side of the casing and the latter holding the casing part 12 against a shoulder of the collar. Any suitable lock nut may be provided for preventing the nut 33 turning, and in this instance I show a common lock nut in the form of a washer 34 arranged between the nut 33 and ratchet 31, this washer having a lip bent over one face of the nut to hold it against movement. If it is desired to vary the tension of the spring, the nut 33 is backed away by first bending up the lip of the nut locking washer 34, and then by turning the ratchet 31 with a suitable tool applied thereto. In this way the tension of the spring 14 can be either increased or decreased.

If it is desired to vary the normal distance that the strap 23 is wrapped around the band 26, this can be readily done by loosening the shock absorber at the point where the nut 22 engages the fitting by which the shock absorber is fastened to the chassis frame and by angularly turning the shock absorber in one direction or another and then reclamping the nut 22 to the fitting. It will then become desirable to adjust the part 12 of the casing with reference to the part 11 so as to bring the peripheral opening through which the strap 23 extends from the casing at the right point to permit free movement of the strap 23 into and out of the casing. To accomplish this, the nut 33 is loosened, the part 12 of the casing is disengaged from the part 11 and is then turned until the peripheral opening of the part 12 is in the right position and then the parts are reclamped together. To permit this relative shifting of the two parts of the casing, the part 12 of the casing is provided with a series of openings 35, in any one of which the end of pin 24 which receives the end of the strap 23 may be inserted, pin 24 being freely disengageable from and insertible in any one of the openings 35 provided in the side of the part 12 of the casing.

In Fig. 4, I show a bridge 36 for supporting the outer convolution of spring 14 at a suitable distance from the point where its outer end is connected to rivet 17. In this instance the bridge 36 is in the form of a loop which passes underneath the metal clip or strip 18, one portion of the loop passing under the outer convolution of the spring. This bridge keeps the form or body of the spring substantially coaxial with the center bolt, and prevents the flexing of the spring near the point where it is connected to rivet 17. This in turn avoids crystallization and increases the life of the spring.

In conclusion it might be mentioned that lubricant may be supplied to the space between the side members of the casing occupied by spring 14 so as to lubricate its convolutions and render it silent in action. This lubricant can be supplied through an axially disposed opening 37, the outer end being normally closed by a plug 38, and its inner end communicating through a suitable opening in the collar 20 with the space in the casing occupied by spring 14.

Having described my invention, I claim:

1. In a shock absorber, a rotary member, a strap connected thereto and adapted to be wound onto and unwound therefrom, and a floating friction member between the rotary member and the strap and engaging the rotary member.

2. In a shock absorber, an annular rotatable member, a strap connected thereto and adapted to be wound onto and unwound therefrom, and a friction member adapted to engage the rotatable member and located between the strap and annular member and having one end only fixed.

3. In a shock absorber, a rotatable member, a strap connected thereto and adapted to be wound onto and unwound therefrom, and a floating friction band enveloping the rotatable member and engageable therewith and arranged between the latter and the strap.

4. In a shock absorber, a rotatable member, a strap connected thereto and adapted to be wound onto and unwound therefrom, and a stationary friction member enveloping the rotatable member so that it may frictionally engage the same and having one end fixed and its opposite end free to come and go.

5. In a shock absorber, a rotatable member, a strap connected thereto and adapted to be wound onto and unwound therefrom, and a stationary friction member having one end fixed and enveloping the rotatable member between the latter and the strap, said friction member adapted to frictionally grip the rotatable member when the latter is turned in one direction by the strap and to be relatively free on the rotatable member when the latter is turned to wind the strap thereon.

6. In a shock absorber, a rotatable member, a spring connected thereto to turn the same in one direction, a strap connected to said member to rotate it in the opposite direction, and a floating friction member enveloping the rotatable member so that it may frictionally engage the same and arranged between the latter and the strap.

7. In a shock absorber, a rotatable member, a spring within the same and connected thereto so as to rotate it in one direction, a strap connected to said member and adapted to be wound onto and to be unwound therefrom, and a stationary friction band extending about said member between the latter and the strap so that it may frictionally engage said member and adapted to alternately grip and release said member as its direction of rotation is changed.

8. In a shock absorber, a center bolt, a spring surrounding the center bolt and having its inner end fixed, a rotatable annulus supported at a distance from the center bolt and surrounding the spring, the latter having its outer end connected to the annulus, a strap connected to the annulus and adapted to be wound onto and unwound therefrom and means for creating a friction on said annulus when it is rotated in one direction.

9. In a shock absorber, a stationary center bolt, a stationary casing, a spring surrounding the center bolt and having its inner end fixed, a rotatable annulus supported by the casing outside of the spring, the latter having its outer end connected to the annulus, a strap connected to the annulus and adapted to be wound onto and unwound therefrom, and a friction member adapted to engage said annulus.

10. In a shock absorber, a stationary casing and a stationary center bolt, the former having two opposite sides, a spring surrounding the center bolt and having its inner end connected thereto, an annulus supported on shoulders of the casing outwardly of the center bolt and spring, the annulus surrounding the spring and having a connection with the outer end of the latter, and a strap adapted to be wound onto and unwound from the annulus.

11. In a shock absorber for vehicles, a rotatable drum, a strap connected thereto and adapted to be wound about the same and to be unwound therefrom, and a friction member, both sides of which are effective to frictionally resist the unwinding of the strap, the frictional resistance offered by one side being variable.

12. In a shock absorber, a rotatable drum, a strap connected thereto and adapted to be wound about the same and to be unwound therefrom, and a friction member, the inner and outer sides of which are effective to frictionally resist the unwinding of the strap, the frictional resistance created by the outer side being variable.

13. In a shock absorber, a rotatable drum, a strap connected thereto and adapted to be wound about the same and to be unwound therefrom, and a friction member, the inner and outer sides of which are effective to frictionally resist the unwinding of the strap, the effective frictional area of the outer side being varied as the strap unwinds.

14. In a shock absorber, a member rotatable in opposite directions, a strap adapted to be wound about the same and to be unwound therefrom, and a flexible friction member with respect to which said rotary member rotates in both directions and which is effective by engagement with said rotatable member to resist the rotation thereof in one direction only.

15. In a shock absorber, a member rotatable in opposite directions, a strap adapted to be wound about the same and to be unwound therefrom, and a flexible friction member with respect to which the said rotary member rotates in both directions, the friction member frictionally engaging the rotary member when it rotates in one direction, and being released therefrom when it rotates in the opposite direction.

16. In a shock absorber, a rotary member, a strap connected thereto and adapted to be wound about the same and to be unwound therefrom as the said member rotates in opposite directions, and a flexible friction member which is caused by the strap to frictionally engage the rotary member when the strap is unwound from the latter.

17. In a shock absorber, a rotary member, a strap connected thereto and adapted to be wound about the same and to be unwound therefrom as said member is rotated in opposite directions, and a flexible friction member which frictionally resists the unwinding movement of the strap and is caused by the strap to frictionally engage said rotary member as it rotates to permit the strap to be unwound.

18. In a shock absorber, a rotary member, a strap connected thereto and adapted to be wound about the same and to be unwound therefrom as said member is rotated in opposite directions, and a flexible friction member which frictionally opposes the movement of the strap off the rotary member and also engages and frictionally opposes said rotary member during the unwinding of the strap.

19. In a shock absorber, a rotary member, a strap adapted to be wound about the same and to be unwound as said member is rotated in opposite directions, and flexible friction means engageable with both the strap and rotary member to frictionally oppose the unwinding of the strap but permitting the free winding in of the strap.

20. In a shock absorber, a member rotatable in opposite directions, a spring connected to said member to rotate the same in one direction, a strap connected to said member and adapted to be wound onto and unwound therefrom, and a floating friction member which frictionally engages the rotatable member to oppose its rotation in one direction but permits relatively free rotation in the opposite direction.

21. In a shock absorber, a member rotatable in opposite directions, a spring connected thereto and serving to rotate it in one direction, a strap adapted to be wound onto and unwound from said member, and a floating friction-creating member engaging the periphery of the rotatable member and serving to resist its rotation in one direction and permitting relatively free rotation in the opposite direction.

22. In a shock absorber, a drum rotatable in opposite directions, a strap adapted to be wound onto and unwound therefrom, a spring connected to the drum to rotate it in one direction, and a floating expansible and contractible friction element engaging the drum and serving to frictionally resist the rotation of the drum when the strap is unwound therefrom and permitting relatively free rotation of the drum when the strap is wound thereon by the rotation of the drum under the action of the spring.

23. In a shock absorber, a drum rotatable in opposite directions, a strap adapted to be wound onto and to be unwound from the peripheral portion thereof and an expansible and contractible floating friction member engaging the peripheral part of the drum and serving to resist the rotation of the drum when it is rotated in one direction and permitting relatively free rotation in the opposite direction.

24. In a shock absorber, a drum rotatable in opposite directions, a strap connected thereto and adapted to be wound onto and unwound therefrom, a spring connected to the drum and serving to rotate the same in one direction, and an expansible and contractible friction member with respect to which the drum rotates in both directions and which automatically engages the drum to frictionally resist its rotation in one direction and automatically releases itself from the drum to permit relatively free rotation in the opposite direction.

25. In a shock absorber, a drum rotatable in opposite directions, a strap adapted to be wound onto and unwound therefrom, a spring connected to the drum for rotating the same in one direction, and an expansible and contractible friction member with respect to which the drum rotates in both directions and which automatically engages the peripheral part of the drum to frictionally resist its rotation in one direction and is automatically released from the drum to permit relatively free rotation in the opposite direction.

26. In a shock absorber, a drum, a strap adapted to be wound onto and unwound therefrom, a spring for rotating the drum in one direction and a floating friction member engageable with a portion of the drum and serving to retard the rotation of the drum as the strap is unwound, said friction member during such movement of the drum having one of its ends held stationary and having a portion at a distance from such end pressed against the drum.

27. In a shock absorber, a drum rotatable in opposite directions, a strap adapted to be wound onto and unwound therefrom, a spring for rotating the drum in one direction, a floating friction member arranged circumferentially of the drum and in contact with said strap, a stop member for holding one end of the friction member stationary, and means whereby said friction member is caused to automatically frictionally engage and to be released from the drum depending upon the direction of rotation thereof.

28. In a shock absorber, a rotatable member, a strap connected thereto and adapted to be wound onto and unwound therefrom, and a friction member interposed between the strap and rotatable member and extending about the same, said member having one end fixed and being inherently flexible so as to frictionally grip the rotatable member under the pressure of the strap and to release the rotatable member when the strap pressure is released.

29. In a shock absorber for vehicles, a rotary member, a strap connected thereto and adapted to be wound about the same and to be unwound therefrom, and a flexible inherently elastic friction member which engages said rotary member and both sides of which are effective to frictionally resist the unwinding of the strap.

30. In a shock absorber, a member rotatable in opposite directions, a strap adapted to be wound about the same and to be unwound therefrom, and a flexible inherently elastic friction member with respect to which said rotary member rotates in both directions and which is effective to frictionally engage and resist the rotation of said rotary member in one direction only.

31. In a shock absorber, a member rotatable in opposite directions, a strap adapted to be wound about the same and to be unwound therefrom, and an inherently elastic friction member with respect to which said rotary member rotates in both directions, the friction member frictionally engaging the rotary member when it rotates in one direction and releasing itself therefrom when it rotates in the opposite direction.

32. In a shock absorber, a rotary member, a strap connected thereto and adapted to be wound about the same and to be unwound therefrom as said member rotates in opposite directions, and an inherently elastic friction member which is caused by the strap to frictionally engage the rotary member when the strap is unwound from the latter and which automatically releases itself from the rotary member when the strap is wound about the latter.

33. In a shock absorber, a rotary member, a strap connected thereto and adapted to be wound about the same and to be unwound therefrom as said member is rotated in opposite directions, and a friction member which frictionally opposes the movement of the strap off the rotary member and also the rotary movement of said member during the unwinding of the strap, said friction member being elastic and automatically releasing itself from the rotary member when the strap is wound about the latter.

In testimony whereof, I hereunto affix my signature.

JACOB R. SNYDER.